US006534713B2

(12) United States Patent
Käfer

(10) Patent No.: US 6,534,713 B2
(45) Date of Patent: Mar. 18, 2003

(54) CABLE SET

(75) Inventor: Bernd Käfer, Mainstockheim (DE)

(73) Assignee: Leoni Bordnetz-Systeme GmbH & Co. KG, Nuremburg (DE)

( * ) Notice: Subject to any disclaimer, the term of this patent is extended or adjusted under 35 U.S.C. 154(b) by 0 days.

(21) Appl. No.: 09/946,761

(22) Filed: Sep. 4, 2001

(65) Prior Publication Data

US 2002/0068486 A1 Jun. 6, 2002

(30) Foreign Application Priority Data

Sep. 1, 2000 (DE) .......................... 100 42 985

(51) Int. Cl.⁷ ............... H02G 3/04; B60J 5/00
(52) U.S. Cl. .................. 174/72 A; 296/146.7
(58) Field of Search .............. 174/72 A, 70 A, 174/71 R, 72 C, 72 R, 135, 54, 61, 64; 191/12 R, 12.4, 22 R, 23 R, 30; 296/146.7

(56) References Cited

U.S. PATENT DOCUMENTS

| | | | |
|---|---|---|---|
| 3,909,047 A | * | 9/1975 | Salmela ................ 174/135 |
| 4,907,836 A | * | 3/1990 | Ueda et al. ............. 174/72 A |
| 4,943,241 A | * | 7/1990 | Watanabe et al. ......... 174/72 A |
| 5,126,507 A | * | 6/1992 | Kirma ................ 174/72 A |
| 5,448,017 A | | 9/1995 | Nakajima et al. |
| 5,584,144 A | * | 12/1996 | Hisano .................. 296/146.5 |
| 5,716,044 A | * | 2/1998 | Peterson et al. .......... 174/72 A |
| 5,879,047 A | * | 3/1999 | Yamaguchi et al. ....... 296/146.7 |
| 5,884,961 A | * | 3/1999 | Serizawa et al. ......... 296/146.7 |
| 5,994,645 A | * | 11/1999 | Suzuki et al. ................ 174/69 |
| 6,051,790 A | * | 4/2000 | Takeuchi et al. .......... 174/70 R |
| 6,079,764 A | * | 6/2000 | Suzuki et al. ............. 174/72 A |
| 6,135,538 A | * | 10/2000 | Serizawa et al. ......... 296/146.7 |

FOREIGN PATENT DOCUMENTS

| | | |
|---|---|---|
| DE | 41 38 714 A1 | 5/1993 |
| DE | 43 02 757 C1 | 3/1994 |
| EP | 0 713 225 A2 | 5/1996 |
| EP | 0 959 545 A2 | 11/1999 |
| JP | 10 164 734 | 6/1998 |

* cited by examiner

*Primary Examiner*—Dean A. Reichard
*Assistant Examiner*—Adolfo Nino
(74) *Attorney, Agent, or Firm*—Laurence A. Greenberg; Werner H. Stemer; Gregory L. Mayback

(57) ABSTRACT

A cable set with a protective covering enclosing a number of individual cables includes a first and a second end part and an intermediate part disposed therebetween. The intermediate part is fixed in terms of rotation on the first end part and is mounted such that it can be rotated over a limited angle range on the second end part. The cable set is provided, in particular, for placement between a body and a door of a motor vehicle and serves for the rotationally secured installation of the cable set.

12 Claims, 3 Drawing Sheets

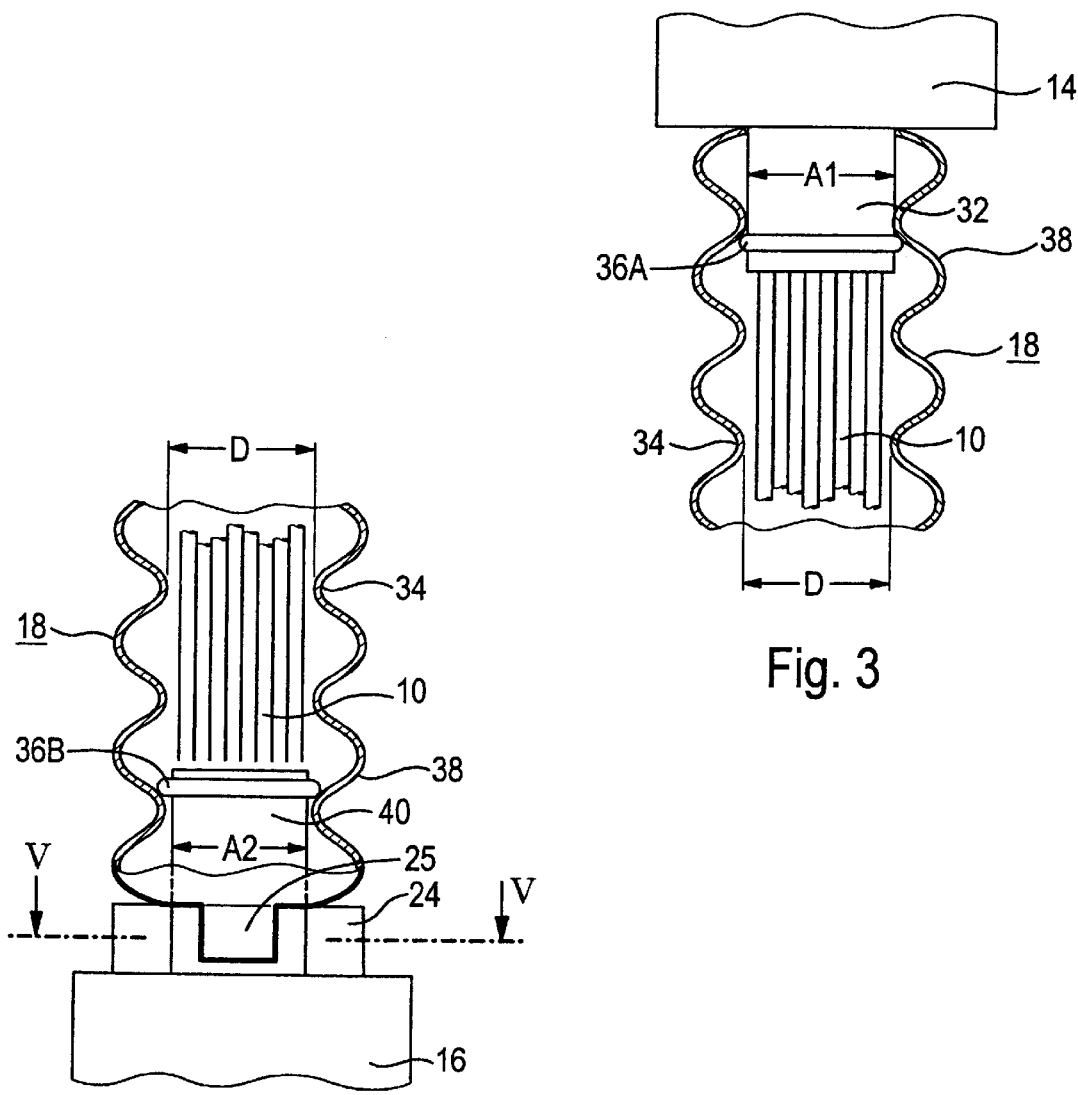
Fig. 3
Fig. 4
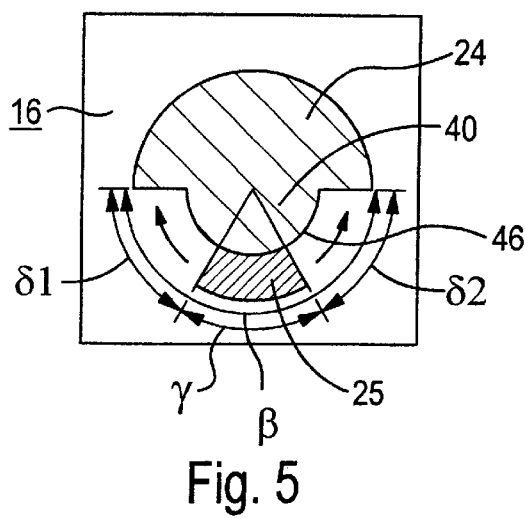
Fig. 5

CABLE SET

BACKGROUND OF THE INVENTION

1. Field of the Invention

The invention relates to a cable set with a protective covering enclosing a number of individual cables.

Such a cable set, which is also referred to as a cable harness, is used, in particular, in automotive engineering. That cable set is usually configured as a prefabricated structural unit that, during assembly of the motor vehicle, is laid at the location envisaged for the cable set. This avoids the high-outlay operation of laying the individual cables. The protective sheath around the individual cables serves for protecting the individual cables against mechanical damage and, at the same time, as a seal in relation to the surroundings. On the one hand, "protective sheath" is to be understood here as a flexible protective sheath, for example a rubber bushing or sleeve, through which the individual cables are routed loosely. On the other hand, "protective sheath" is also to be understood as a foam encapsulation for the individual cables, as is used, in particular, for producing dimensionally stable cable sets.

A critical point in automotive engineering is the supply of electricity to the electrical components fitted in a door, for example window lifters and loudspeaker boxes. For this purpose, the individual cables have to be routed from the body into the door via the door-pivoting region. It is usually the case that holes for the lead-through of the cable set are made, in the end sides in each case, in the body pillar on which the door is mounted and in the door itself. End side is understood here as the region which is directed from the outside of the vehicle to the inside of the vehicle. However, the lead-through holes weaken the stability. Provision is thus made for the lead-through holes to be provided in the inside of the vehicle rather than on the end sides.

If, then, use is made of a cable set that is fastened on the body pillar by a first end part and on the door by a second end part, there is a risk of the two end parts being rotated through 360° in relation to one another during installation, with the result that the individual cables routed loosely in the cable set are twisted. Because the protective sheath is usually constructed as a sleeve or bushing in the door-pivoting region, this twisting is not detected. The twisting may result in the individual cables being subjected to high mechanical loading.

SUMMARY OF THE INVENTION

It is accordingly an object of the invention to provide a cable set that overcomes the hereinafore-mentioned disadvantages of the heretofore-known devices of this general type and that ensures correct installation.

With the foregoing and other objects in view, there is provided, in accordance with the invention, a cable set. The cable set includes a number of individual cables, a protective covering enclosing the number of individual cables, a first end part, a second end part, and an intermediate part. The intermediate part is disposed between the first end part and the second end part, rotationally fixed on the first end part, and rotatably mounted over a limited angle range on the second end part.

Intermediate part is understood here, in particular, as a corrugated-tube-like protective sleeve or protective bushing in which the individual cables are positioned loosely.

On the one hand, this configuration is based on the concept of incorrect rotation of the cable set being indicated visually by rotation of the intermediate part. In the case of incorrect installation, the intermediate part is thus rotated together with the individual cables. Accordingly, the installer immediately detects that incorrect installation has taken place. On the other hand, this configuration is based on the concept of simultaneously allowing a certain amount of rotation, in order to eliminate visually undesirable twisting of the sleeve as the door is opened. These two requirements are fulfilled by the intermediate part being fixed at one end and mounted such that it can be rotated only over a certain angle range at its other end. In the case of rotation beyond the predetermined angle range, the intermediate part rotates and the inadmissible rotation can be detected.

In order to limit the angle range, it is preferable for a stop to be provided on the intermediate part and a mating stop to be provided on the second end part. The mating stop here acts as an abutment for the stop. This configuration realizes a mechanically reliable rotation-preventor.

For a straightforward and, at the same time, reliable configuration, the stop and the mating stop, according to a preferred configuration, are formed by a stub and a ring segment. The stub and the ring segment, once installed, are positioned in relation to one another such that the stub is guided in the segment opening, defined by the ring segment, and strikes against the free end sides of the ring segment.

It is expedient here for the opening angle of the segment opening essentially to determine the limited angle range over which the cable set can itself rotate without the intermediate part being twisted. "Essentially" is understood here as meaning that the opening angle of the segment opening minus the angle covered by the extent of the stub defines the angle range.

Expediently provided on the first end part is a fixing stub, over which the intermediate part is precisely fitted such that a rotationally secured connection is formed between the fixing stub and the intermediate part. Disposing a fixing stub on the end part allows the intermediate part to be fixed in a straightforward manner.

The rotationally secured connection is preferably formed here as a rotationally secured frictional connection. For this purpose, the fixing stub is advantageously over-dimensioned, i.e. its external diameter is at least equal to or greater than the internal diameter of the intermediate part. Such a friction fit is very straightforward to construct. As an alternative to the friction fit, it is also possible for the rotationally secured connection to be realized, for example, by a form-locking connection, in particular, a tongue and groove.

Preferably provided on the second end part is a guide stub. Over the guide stub, the intermediate part is precisely fitted such that the intermediate part can be rotated around the guide stub. Here too, configuring the guide stub on the second end part achieves a configuration for guiding the intermediate part that is straightforward in production terms. For the capacity for rotation here, provision is made, in particular, for the guide stub to be under-dimensioned, i.e. for its external diameter to be smaller than the internal diameter of the intermediate part.

There is preferably provided a securing element against axial displacement of the intermediate part relative to the two end parts. This prevents, in particular, the situation where the intermediate part slides down accidentally from the guide stub, thus eliminating the effectiveness of the rotation-preventor formed by the stop and the mating stop.

It is expedient here for the securing element to be formed by a securing crosspiece that encircles, in particular, the guide stub and/or the fixing stub. The securing crosspiece engages in the intermediate part, which is preferably constructed in the manner of a bellows. In addition to securing against axial displacement, the securing crosspiece at least partially seals the intermediate.

For straightforward cost-effective production, according to a preferred configuration, the stop is formed integrally with the intermediate part and from the same material. The intermediate part usually is composed of a rubber material.

As an alternative, the stop and the intermediate part can be formed from different materials. For example, the stop can be preferably formed by a plastic material and is fastened in a suitable manner on the intermediate part, which is constructed in particular as a rubber sleeve. Suitable material selection avoids any possible disruptive noise from the rotation of the stop in relation to the guide stub.

Other features that are considered as characteristic for the invention are set forth in the appended claims.

Although the invention is illustrated and described herein as embodied in a cable set, it is nevertheless not intended to be limited to the details shown, since various modifications and is structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a fragmentary, enlarged partial sectional and partial plan view of a first end part of a cable set;

FIG. 4 is a fragmentary, enlarged partial sectional and partial plan view of a second end part of the cable set; and FIG. 5 is a sectional view taken along line V—V according to FIG. 4 in the region of a guide stub.

DESCRIPTION OF THE PREFERRED EMBODIMENTS

Figure 1:
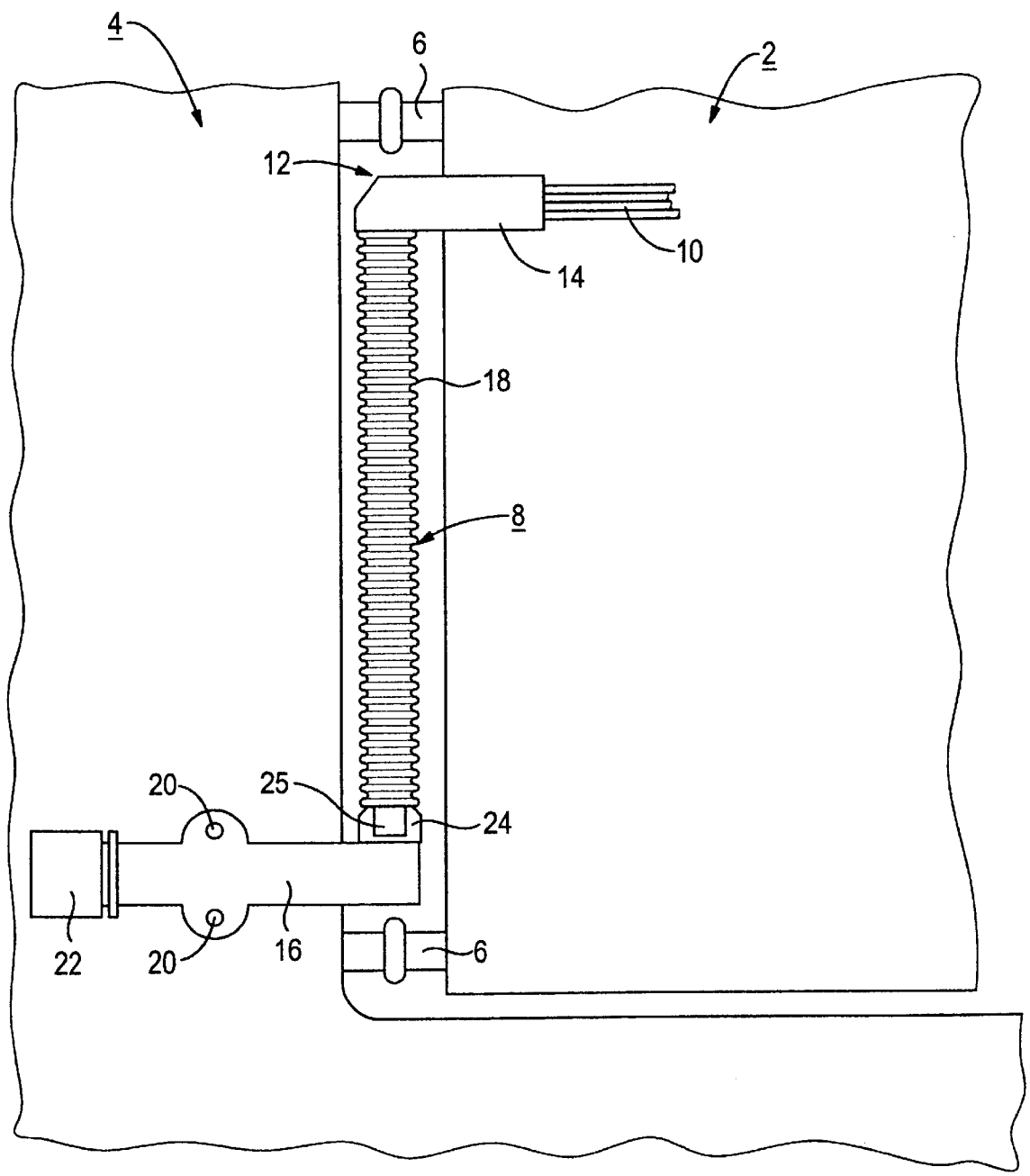
FIG. 1 is a fragmentary, diagrammatic, side view of a connecting region between a body and a door of a motor vehicle.

In all the figures of the drawing, sub-features and integral parts that correspond to one another bear the same reference symbol in each case.

Figure 2:
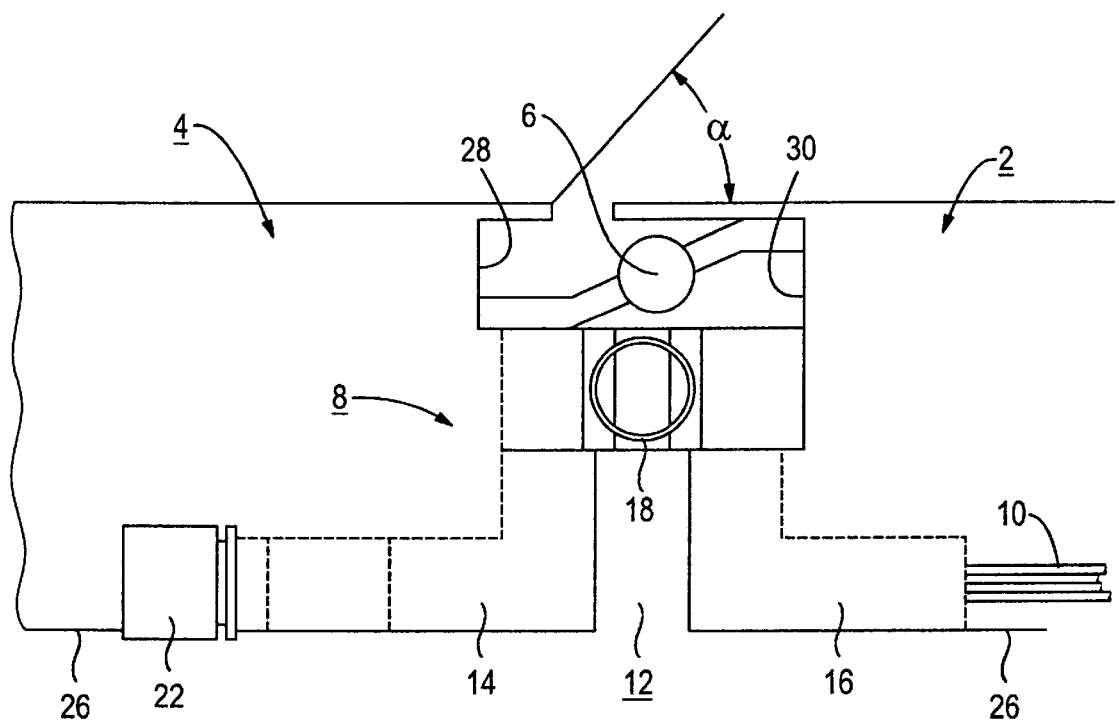
FIG. 2 is a fragmentary, plan view of the connecting region according to FIG. 1.

Referring now to the figures of the drawings in detail and first, particularly to FIGS. 1 and 2 thereof, there is shown, in a motor vehicle, a door 2 is mounted pivotably, via hinges 6, on the body 4, in particular on the so-called windshield pillar. In order to supply electricity to current consumers (not illustrated) disposed in the door 2, a prefabricated cable set 8 is provided. The cable set includes a number of individual cables 10 and routes the latter from the body 4 into the door 2 via a pivoting region 12 between the door 2 and the body 4. The cable set 8 runs vertically upward to the pivoting region 12 and is constructed as a prefabricated structural unit. The door 2 can be pivoted in the pivoting region 12 through a pivoting angle a of approximately 80° (see FIG. 2).

The individual cables 10 are enclosed here by a protective sheath of the cable set 8, which includes a first end part 14, a second end part 16, and an intermediate part 18. The intermediate part 18 is disposed between the two end parts 14, 16 and is constructed in the manner of a rubber bushing. The second end part 16 has fastening link plates 20 for fastening on the body 4. Furthermore, the second end part 16 has a disconnecting location 22 that is constructed, for example, in the manner of an adapter and at which the cable set 8 can be disconnected. A mating stop 24 is provided on the second end part 16 in the connecting region to the intermediate part 18. The mating stop 24 interacts with the stop 25 integrally formed on the intermediate part 18. The two end parts 14, 16 are configured in a dimensionally stable manner, in particular, as foamed parts. In contrast, the intermediate part 18 is preferably configured as a rubber or plastic sheath through which the individual cables 10 are routed loosely.

As shown in FIG. 2, the two end parts 14, 16 are constructed as angle parts and route the individual cables 10 from the inside 26 of the vehicle into the pivoting region 12 between the body 4 and the door 2. The cable set 8 is conventionally routed from the end side 28 of the body through an end side 30 of the door 2 via the pivoting region 12. For this purpose, it is necessary to have lead-through holes both on the body side and on the door side, the holes—on account of the relatively narrow end-side region—weakening the stability.

During the installation of the cable set 8, there is a risk of the two end parts 14, 16 rotating incorrectly in relation to one another. For example, the second end part 16 is rotated through 360° in relation to the installed position envisaged, with the result that, although it butts against the body 4 in the correct angle position, there is twisting of the individual cables 10 in the region of the intermediate part 18. As a result, in some circumstances, the individual cables 10 are subjected to high mechanical loading.

In order to prevent such incorrect installation, the cable set 8 has a rotation-preventor, as is explained in more detail herein below with reference to FIGS. 3 to 5. According to FIG. 3, the first end part 14 includes an end-side fixing stub 32, over which the corrugated-tube-like intermediate part 18 is fitted. In this case, the individual cables 10 are routed out of the end side of the fixing stub 32, which is formed, as a foamed part, integrally with the first end part 14, and run in a loosely positioned manner in the intermediate part 18. The external diameter A1 of the fixing stub 32 here is equal to and preferably greater than the internal diameter D of the intermediate part 18 in the region of a corrugation trough 34. The fixing stub 32 is thus over-dimensioned in relation to the intermediate part 18, with the result that it forms a form-locking, friction fit with the intermediate part 18. Rotation of the intermediate part 18 in relation to the fixing stub 32 is thus avoided. A securing crosspiece 36A encircles the fixing stub 32. On the one hand, the crosspiece serves to secure the intermediate part 18 against sliding down axially in an undesirable manner from the fixing stub 32. At the same time, the securing crosspiece 36A also performs a certain sealing action. For both these functions, the securing crosspiece 36A engages in a corrugation crest 38 of the intermediate part 18.

As shown in FIG. 4, the second end part 16 has, on its end side, a guide stub 40. Over the guide stub, the intermediate part 18 is fitted. In this case, the guide stub 40 is under-dimensioned, i.e. the external diameter A2 of the guide stub 40 is smaller than the internal diameter D of the intermediate part 18 in the region of a corrugation trough 34. Analogously to the fixed stub 32, an encircling securing crosspiece 36B is disposed on the guide stub 40. The crosspiece 36B prevents axial displacement of the intermediate part 18 in relation to the guide stub 40.

As can be gathered from FIGS. 4 and 5, the stop 25 integrally formed at the end of the intermediate part 18 is constructed in the manner of a stub. The mating stop 24, which is fitted on the second end part 16, is formed by a ring segment, to be precise in particular by a semicircular ring segment with a segment opening 46 that covers an opening angle β of 180°. The guide stub 40 and the mating stop 24 are preferably formed integrally with the second end part 16 as a foamed molding. The opening angle β minus a stop angle γ defines an angle range δ1+δ2 over which the intermediate part 18 can be rotated in relation to the guide stub 40. The stop angle γ is defined here as the angle covered by the stop 25.

The limited angle range 1+2 allows the two end parts 14, 16 to rotate relative to one another without the intermediate part 18 itself being rotated. This avoids visually undesirable rotation of the intermediate part 18 when the door 2 is pivoted through the pivoting angle. At the same time, the formation of the limited angle range 1+2 achieves the situation where, in the case of rotation beyond this angle range 1+2, the intermediate part 18 is itself rotated, which is immediately plain to see. If therefore, during the installation of the cable set 8, the latter is installed incorrectly, that is to say in a manner in which it is itself rotated, this can immediately be detected by way of the twisted intermediate part 18.

I claim:

1. A cable set, comprising:

individual cables;

a protective covering enclosing said individual cables;

a first end part;

a second end part; and an intermediate part disposed between said first end part and said second end part, rotationally fixed on said first end part, and rotatably mounted over a limited angle range on said second end part.

2. The cable set according to claim 1, including:

a stop disposed on said intermediate part;

a mating stop disposed on said second end part for limiting the angle range by abutting said stop.

3. The cable set according to claim 2, wherein said stop is a stub and said mating stop is a ring segment.

4. The cable set according to claim 3, wherein said ring segment has a segment opening with an opening angle determining the angle range.

5. The cable set according to claim 2, wherein said stop is formed integrally with said intermediate part and from the same material.

6. The cable set according to claim 2, wherein said stop and said intermediate part are formed from different materials.

7. The cable set according to claim 1, including a fixing stub disposed on said first end part, said fixing stub inserted in said intermediate part and rotatably securing said fixing stub to said intermediate part.

8. The cable set according to claim 7, wherein said fixing stub is rotatably fixed to said intermediate part by friction.

9. The cable set according to claim 7, including a securing crosspiece over said fixing stub having a diameter greater than an outer diameter of said fixing stub and greater than an inner diameter of said intermediate part.

10. The cable set according to claim 1, including a guide stub disposed on said second end part for inserting into said intermediate part, said intermediate part rotating about said guide stub.

11. The cable set according to claim 10, including a securing element disposed on said guide stub preventing said intermediate part from axially displacing.

12. The cable set according to claim 11, wherein said securing element is a securing crosspiece encircling said guide stub.

* * * * *